United States Patent [19]

Mo et al.

[11] 3,890,641

[45] June 17, 1975

[54] HELICAL SCAN MAGNETIC TAPE TRANSPORT SYSTEM INCLUDING VACUUM COLUMN TENSION CONTROL AND HELICAL SCANNER AIR BEARING

[75] Inventors: Frank S. C. Mo, Cupertino; Vernon R. Natwick, Woodside, both of Calif.

[73] Assignee: International Video Corporation, Sunnyvale, Calif.

[22] Filed: Apr. 25, 1973

[21] Appl. No.: 354,227

Related U.S. Application Data

[63] Continuation-in-part of Ser. No. 285,923, Sept. 1, 1972, abandoned.

[52] U.S. Cl. .................... 360/71; 226/95; 242/185; 360/84; 360/128; 360/130

[51] Int. Cl. .. G11b 15/43; G11b 15/60; G11b 5/52

[58] Field of Search ...... 179/100.2 T; 242/182, 183, 242/184, 185; 226/95; 360/71, 83-85, 90-96

[56] References Cited

UNITED STATES PATENTS

| | | | |
|---|---|---|---|
| 3,050,594 | 8/1962 | Bick et al. | 242/184 |
| 3,134,528 | 5/1964 | Dickey | 179/100.2 PM |
| 3,156,423 | 11/1964 | Potter et al. | 242/185 |
| 3,159,501 | 12/1964 | Maxey | 179/100.2 T |
| 3,176,893 | 4/1965 | Schoeneman | 242/182 |
| 3,329,364 | 7/1967 | Brettez | 242/182 |
| 3,355,076 | 11/1967 | Cheney et al. | 226/95 |
| 3,614,338 | 10/1971 | Bogels | 179/100.2 T |
| 3,617,650 | 11/1971 | Morello | 179/100.2 PM |
| 3,748,408 | 7/1973 | Warren | 179/100.2 T |
| 3,777,075 | 12/1973 | Hendershot | 360/71 |

*Primary Examiner*—Vincent P. Canney
*Assistant Examiner*—R. S. Tupper
*Attorney, Agent, or Firm*—Limbach, Limbach and Sutton

[57] ABSTRACT

A helical wrap tape transport system having a plurality of components cooperating to provide a low friction and highly accurate transport of magnetic tape for video broadcasting. The transport system has a helical scanner assembly with a rotating scanning drum having helical surface V-grooves which create an air bearing for magnetic tape wrapped across the drum and oppositely mounted recording transducers which permit continuous recording on a 180° tape wrap around the drum, and a stationary drum on a common axis with the rotating drum having a fixed control track transducer for synchronizing tape transport at the scanning assembly. The transport system has further, air bearing guide posts and a pair of vacuum columns which continuously monitor a tape supply loop which in combination with the guide posts provide a section of low inertia recording tape, the transport of which can be controlled by a single high friction drive capstan.

5 Claims, 28 Drawing Figures

HELICAL SCAN MAGNETIC TAPE TRANSPORT SYSTEM INCLUDING VACUUM COLUMN TENSION CONTROL AND HELICAL SCANNER AIR BEARING

BACKGROUND OF THE INVENTION

This application is a continuation-in-part of our prior copending application, Ser. No. 285,923 filed Sept. 1, 1972, now abandoned.

To employ magnetic tape as a medium for storage of large quantities of information, which must be delivered at high rates, alternate formats from conventional longitudinal track formats have been developed for use in video broadcast and other wide band or high information level applications. With improved recording head designs narrower track widths are possible with a corresponding ability to include a greater number of tracks per unit width of tape size. Additional improvements in recording head and tape response characteristics enable the relative speed between head and tape to be vastly increased. These improvements which make wide band signal recording possible make conventional longitudinal track recording impractical. Multiplying the number of recording tracks and recording heads and increasing the speed of tape transport in longitudinal recording have limitations which make other methods and formats for recording on magnetic tape attractive.

For handling video broadcast signals the principal format presently used is a quadruplex transverse format in which a high relative speed between heads and tape is accomplished by recording in tracks transverse to tape length. In a system employing this format, four recording heads are arranged on the peripheral surface of a high speed rotating drum. Magnetic tape is moved longitudinally to the axis of the drum and cupped or "canoed" to conform to a portion of the peripheral surface of the drum. The recording heads are activated sequentially as they transversely sweep the surface of the tape and either read or write in a series of transverse tracks across the width of the tape.

While a quad system can adequately handle the broad band signals of video recording, the mechanical components for accurate tape transport are not susceptible to simplification or to the low friction transport necessary for long tape life and responsive positional adjustments for accurate operation.

An alternate format to quadruplex recording comprises a helical format derived from a helical wrapping of recording tape about a drum containing one or more rotating recording heads at its peripheral surface. As the tape is drawn around the drum, consecutive tracks are diagonally recorded across the tape. If the heads are fixed to the drum and the drum is caused to rotate, an air bearing can be generated by select designs of the surface of the drum. The friction created by an encircling wrap can thereby be substantially reduced.

Early helical wrap tape transports employed what is commonly known as an alpha wrap, which as the letter suggests is a complete crossover loop around the drum, and a single rotating head. The tape tracks thereby obtained were long and arranged at a very acute angle to the length of the tape. A single head arrangement had the advantage of enabling a full field to be written in video recording with a single pass or rotation of the head. However, the drop-out period in the interim between ending one pass and initiating another required a patchwork supplement on other parts of the tape which added to the overall complexity of the tape format. One additional practical limitation in an alpha wrap transport was the crossover loop required, which left a twist in the tape when the wrapped portion was removed from the drum. This crossover loop complicated the design considerations in the support apparatus for threading and transporting the tape in the system.

An omega wrap, which as the letter suggests, is fundamentally formed with a loop without a crossover. While an omega wrap may also be used in a single head system, the 360° wrap required unduly strains the tape in the sharp switchback at the beginning and end of the wrap and is thus more attractive for multiple head systems where only a portion of a scanning drum is encircled.

The omega wrap is more advantageously employed in a double head system in which two diametrically arranged heads on a rotating drum alternately scan in diagonal tracks across the tape. If the tape wrap is in excess of 180° a continuous signal can be transferred to, or picked up from, the tape by appropriate switching of the heads. With such a format, helical recording can be restricted to the central portion of the tape allowing additional longitudinal tracks to be included adjacent the edges of the tape.

The quantity of information recordable on a magnetic tape is, of course, proportional to the area of the tape. Thus the rate of information storage or retrieval is dependent on the width of the tape and the speed of tape travel. A wide tape can necessarily be transported at a slower rate than a narrow tape and present the same available surface area to one or more transducers for recording. However, when a wide tape is selected special transport problems arise from the width of the tape which increase in beam stiffness as a cubic function of its width.

SUMMARY OF THE INVENTION

The transport system of this invention uses an omega wrap helical scanner carrying a pair of rotating recording heads in combination with a plurality of stationary heads to read and write complex wide band signals. The system is particularly adapted to handle high information video broadcast signals of the several international standards (NTSC, PAL, SECAM), and requires only circuit variations of the supporting electronics which peripherally affect certain transport controls, but does not require modifications in the mechanical structure of the transport system. A basic tape format for this transport system for the above mentioned international standards is disclosed in the copending application of Barrett E. Guisinger, entitled, Helical Scan Wide Band Tape Recorder Apparatus and Method, Ser. No. 285,922 filed Sept. 1, 1972 and assigned to the same assignee as this application.

The heart of this invented tape transport system comprises the helical scanner assembly where video signals are recorded or read and where the timing or heartbeat of the overall tape transport is controlled. As noted hereinbefore, the immense amount of information required to product a complex video signal necessitates a high relative speed between the recording head and the tape. The scanner assembly therefore comprises a stationary drum coupled to a rotating drum which carries a pair of diametrically positioned recording transducers or heads.

To obtain the information rates that are required for video recording the rotating drum is rotated at 9000 rpm. At these rotational speeds with a drum having over a 3 inch diameter, the tape cannot contact the drum without substantial wear and possible damage. The tape must therefore be floated over the surface of the drum on an air cushion or air bearing. Ordinarily a tape that is tangential to a rotating surface generates its own air bearing since the tape, where it is about to contact the rotating surface, performs much like an air foil. However, where the tape is skewed, as in a helical wrap, and is in part wrapped on a stationary drum, a uniform air bearing cannot be generated. Therefore, the improved surface grooving of the rotating drum of the scanner assembly provides a controlled airbearing surface that permits the tape to be transported as closely as possible to the surface of the rotating drum without contacting the surface. The improved surface grooving utilizes a V-notch with one side of the notch substantially radial and the other side substantially tangential to the cylindrical surface of the rotating drum. The grooves are preferably arranged in a helical manner on the surface at an angle only slightly displaced from a parallel to the axis of rotation.

The multiplicity of narrow recording tracks creates extreme control problems to align the rapidly rotating heads with the proper tracks, particularly where the physical characteristics of a recorded magnetic tape have changed over a period of time from sketching or shrinking. Similar problems are encountered when a particular tape is recorded on one machine and replayed on another machine. To solve these problems a stationary control head is mounted on the stationary drum of the scanner assembly. The control head is keyed to the rotation of the rotating drum and records a longitudinal timing control track in close proximity to the area that the diagonal video tracks are recorded. In this manner the tape conditions, including local stretch and speed, are recorded on a reference control track which can be subsequently utilized to duplicate these conditions on playback.

The body of this tape transport system is in the cooperating manner in which the various components provide a nearly frictionless and highly responsive transport of the tape through the system. From the time the tape leaves a supply reel to the time the tape arrives at the takeup reel, it rides under pneumatic control and on air bearing surfaces except at one idler roller used for damping any vibrational flutter in the tape, and at a high friction drive capstan. The drive capstan is accurately servo controlled in synchronism with the rotating drum or with the reference control track signals. The circuitry and control logic is disclosed in greater detail in the copending application of Kenneth Louth, entitled Video Tape Recorder Method and Apparatus, Ser. No. 285,917, filed Sept. 1, 1972 and assigned to the same assignee as this application.

Since the tape is essentially "floated" under pneumatic controls and on air bearings, the drive capstan can impart virtually immediate response changes in the tape transport which are inhibited only by the inertia of a relatively short section of tape. The immediate response is particularly necessary to adjust tape speed in accordance with signals from the reference control track on playback to insure alignment of the rotating head with the diagonal video tracks.

To accomplish the floating of the tape, stationary guide posts are equipped with air bleed holes through which air is forced to create an air bearing surface for low friction transport. Tape tension is pneumatically controlled by a pair of vacuum columns each of which retains a long loop of tape by a low pressure on one side of the tape loop that draws the tape into the column. Tension of the tape can be variably controlled by adjustment of the pressure in the vacuum column. The tape loop provides an immediate source of available low inertia tape supply for rapid accelerations and shuttling by the drive capstan during the various operations of the transport system.

To prevent local tape wear, a vacuum collar is arranged about the scanner assembly and displaces the tape from the drums by a suction action when tape transport is stopped, and thereby prevents the tape from incurring localized wear caused by the high speed rotation of the heads across an isolated portion of the tape.

These and other features, including the sound and vibration damped deck casting which supports and vibrationally isolates the various components disclosed in detail in the copending application of Vernon R. Natwick, entitled Vibrational and Acoustical Damped Casting, Ser. No. 285,916, filed Sept. 1, 1972 and assigned to the same assignee as this application, all contribute to produce a compact but high performance tape transport system described in detail hereinafter.

DETAILED DESCRIPTION OF THE PREFERRED EMBODIMENT

Figure 1:
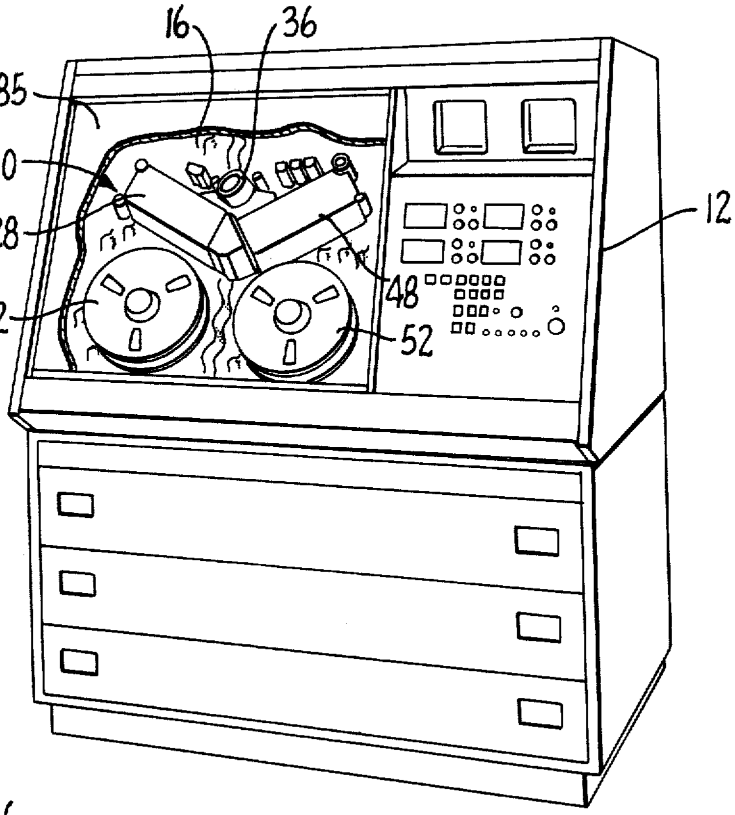
FIG. 1 is a schematic perspective view of the tape transport system in a control console.

Referring to FIG. 1 the magnetic tape transport system 10 is shown mounted in a control console 12 containing the supporting electronics for operating the transport system for video recording and playback. The arrangement of the principal components of the tape transport system are shown in greater detail in FIG. 2 and can be conveniently described in relation to the path of a wide magnetic tape threaded through the transport system therein.

Figure 2:
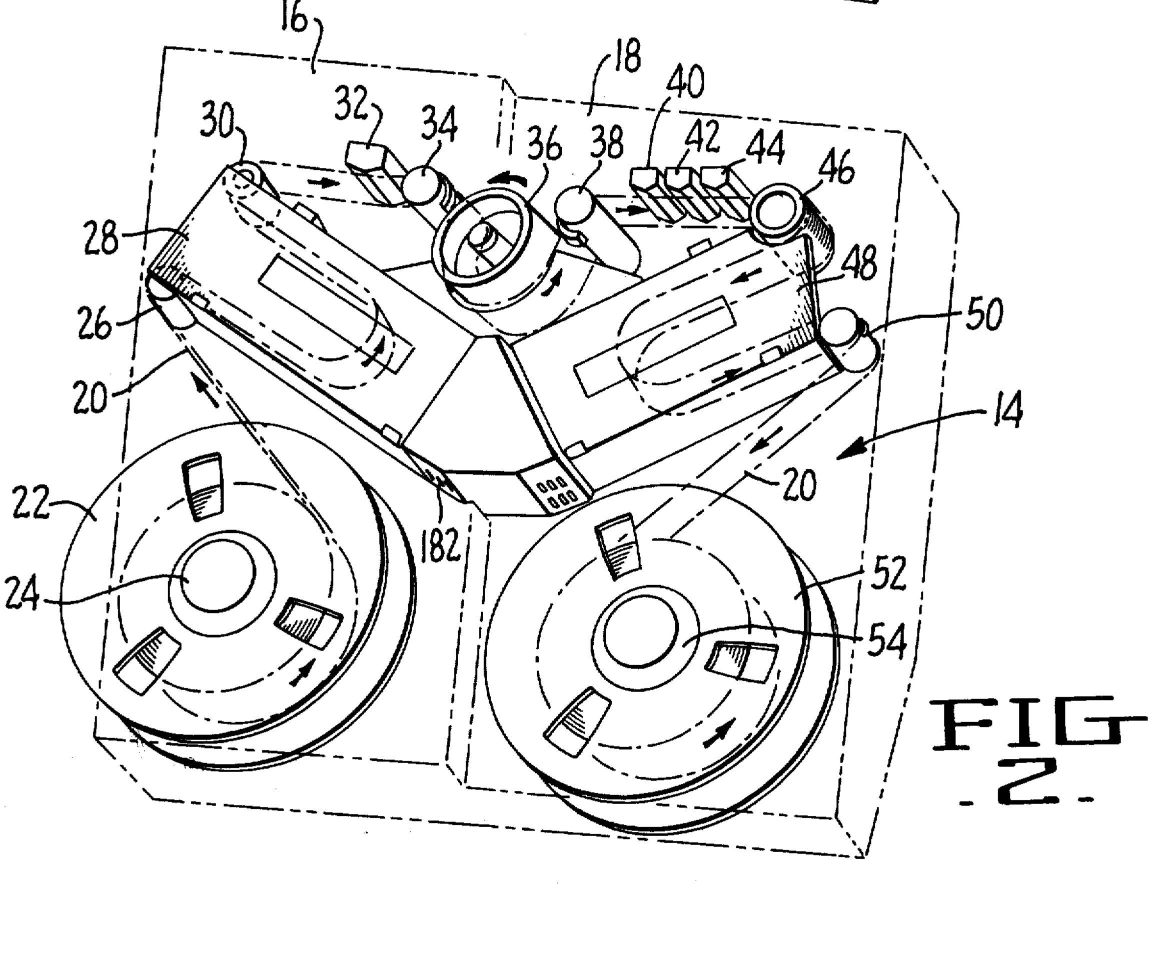
FIG. 2 is a perspective view partially in phantom of the principal component of the tape transport system.

In FIG. 2 a video tape deck 14, shown in phantom, has an upper deck plate 16 and a lower deck plate 18 arranged to accommodate the helical wrap and thus vertical displacement of a 2 inch wide magnetic tape 20, also shown in phantom. The magnetic tape 20 is shown wound on a supply reel 22 mounted on a hub 24 rotatably attached to the upper deck plate. The magnetic tape 20 is passed around a first vertical air bearing guide post 26 and is looped into a first vacuum column 26 and hence out and around an idler roller 30 which dampens any vibrational flutter created in the vacuum column. From the idler roller 30 the tape travels across a full width erase head 32, around a first slanted air bearing guide post 34, and around a portion of the scanner assembly 36.

At the scanner assembly the helical wrap causes the tape to drop to the lower deck plate 18 before passing around a second slanted air bearing guide post 38 and traversing across a bank of three record playback head stacks 40, 42, and 44. Head stacks 40, 42 and 44 carry various audio cue, address code, video confidence and erase heads for use in a video tape format as described in the application entitled, Helical Scan Wide Band Tape Recorder and Method, and referred to above. After traversing across the bank of head stacks, the magnetic tape 20 passes around a drive capstan 46, which controls both speed and direction of tape movement, and loops into a second vacuum column 48, which in combination with the first vacuum column 28 controls the tension in the tape and the tape supply available for rapid adjustments made by the drive capstan. From the second vacuum column 48 the tape passes around a second vertical air bearing post 50 and is wound on a take-up reel 52 mounted on a hub 54 rotatably attached to the lower deck plate.

Figures 3, 4:
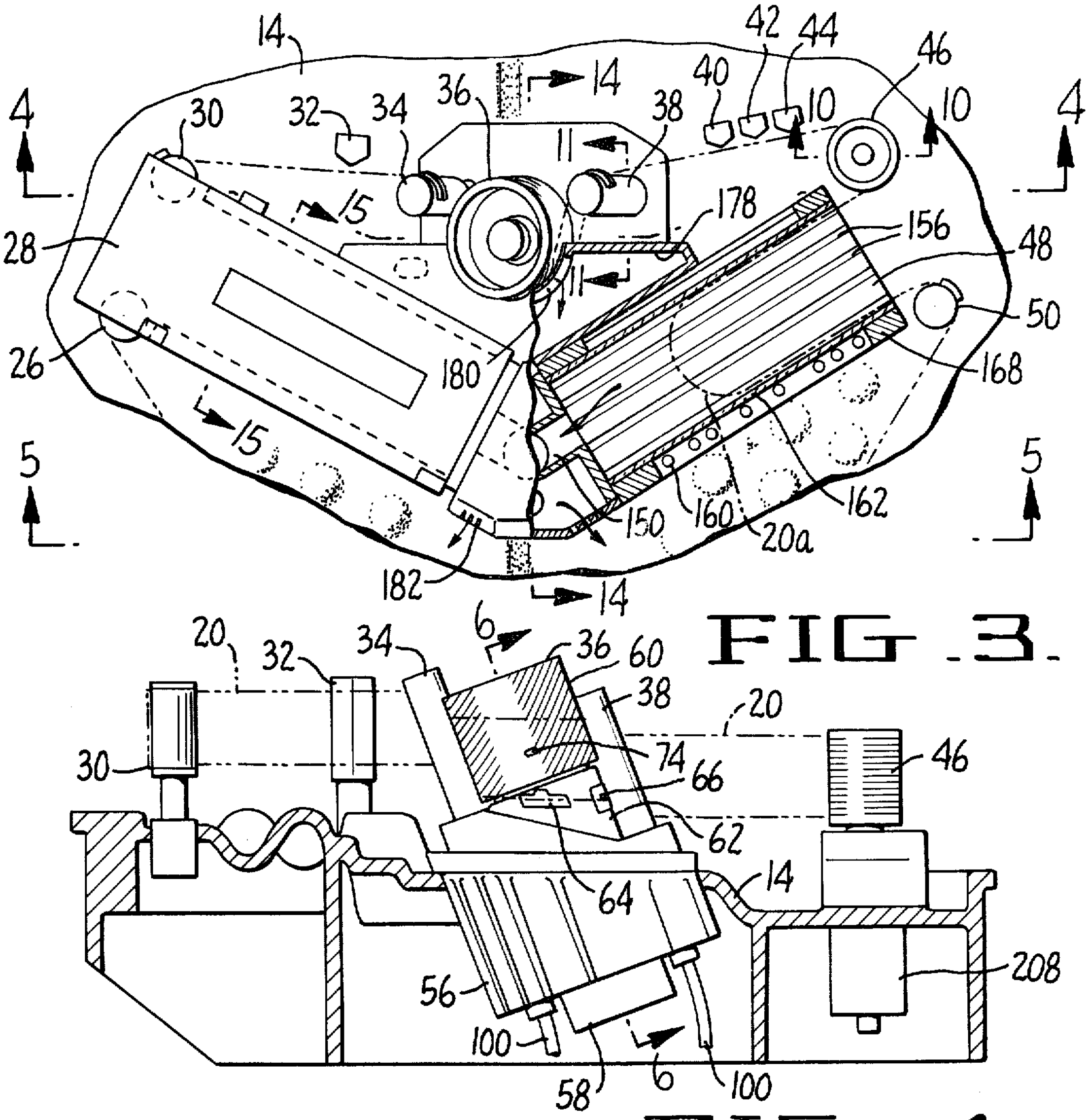
FIG. 3 is a fragmentary plan view partially in section of the principal components of the tape transport system.
FIG. 4 is a sectional view taken on lines 4—4 in FIG. 3.

The path of tape transport outlined above is designed to supply tape at the scanner assembly having a minimum of frictional and inertial restraints to instantaneous responsive movements. As noted before the scanner assembly comprises the heart of the invented transport system with its operation, however, dependent on the supporting components. With reference to FIGS. 3 and 4 the scanner assembly 36 is shown mounted to the tape deck 14 at an angle of 19.56° which compensates for the helical wrap of the tape 20 at the desired format angle of video recording.

As shown in FIG. 4, the scanner assembly includes a base casting 56 which carries the remaining assembly components and essentially forms a separate isolated unit necessary to maintain the exacting tolerances in the assembly. Mounted in the base casting is a drive motor 58 which rotates a scanning drum 60 around which the tape 20 is helically wrapped. The scanning drum carries a plurality of recording and erase transducers or heads and rotates at approximately 9,000 rpm. At these rotational speeds, the balance of the scanning drum must be virtually perfect.

Immediately adjacent to the scanning drum 60 is a stationary drum 62 across which a small portion of the lower edge of the tape is wrapped. The stationary drum has a tape edge guide 64, which comprises simply a shelf-like projection that restricts the downward drift of the tape. More importantly, the stationary drum has a reference control signal head 66 which during recording is electronically keyed to the rotation of the scanning drum to provide a coordinated reference control signal longitudinally on the tape immediately adjacent the area of the recorded video signal from the scanner heads.

Figure 6:
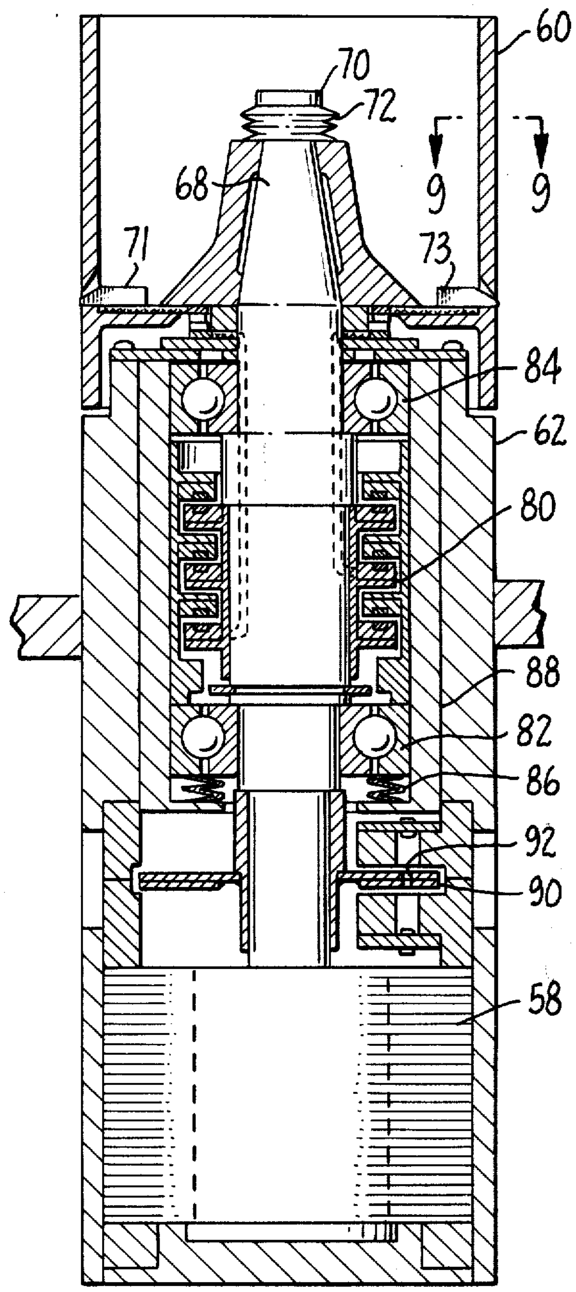
FIG. 6 is an enlarged sectional view of the scanner assembly taken on the lines 6—6 in FIG. 3.
Figure 7:
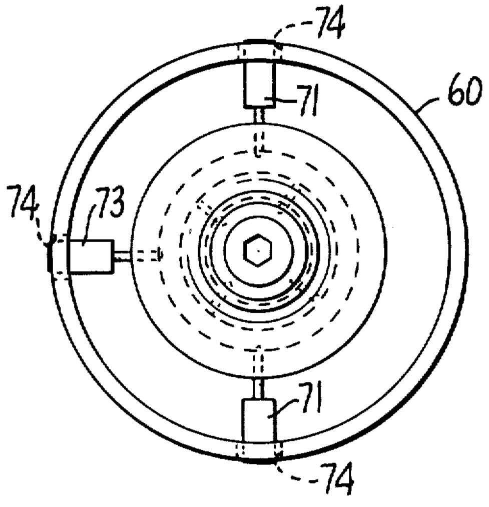
FIG. 7 is a plan view of the scanner assembly of FIG. 6.

The principal elements in the scanning assembly are shown in greater detail in FIGS. 6, 7, 8 and 9. In FIG. 6, the scanning drum 60 is mounted to a drive shaft 68 and secured by a bolt 70 having a compressed collar 72. Mounted within the scanning drum are two video recording heads 71 and a double track erase head 73 which is shown in FIG. 7. The heads are adjustably mounted to permit the transducer element to be moved flush with or slightly protruded from apertures 74 in the surface periphery of the drum. The recording heads are arranged exactly 180° apart and alternately scan the tape which is wrapped approximately 188° around the scanning drum. By appropriate switching between the heads, a continuous signal can be recorded on the tape.

Figure 8:
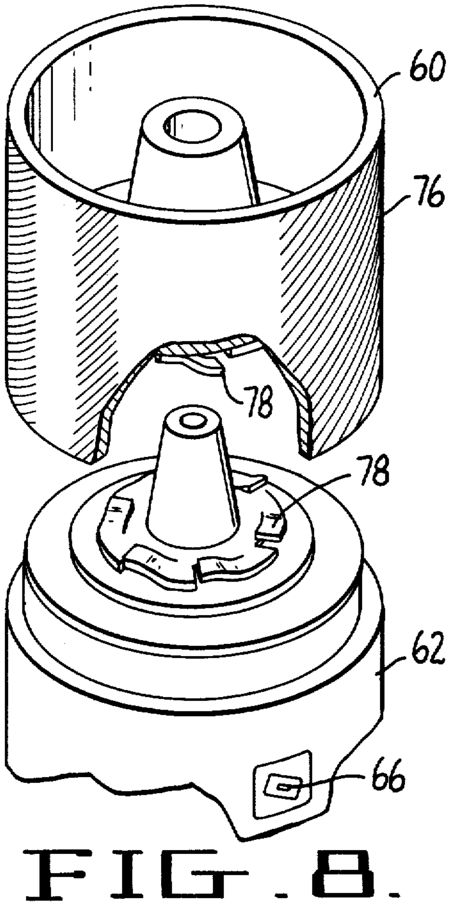
FIG. 8 is a fragmentary exploded view of the scanner assembly of FIG. 6.
Figure 9:
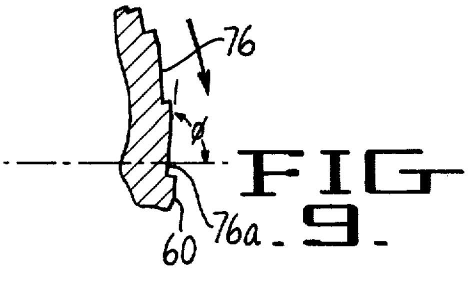
FIG. 9 is a fragmentary sectional view taken on the lines 9—9 in FIG. 6.

The scanning drum 60 as shown in FIGS. 8 and 9 have a plurality of V-notch grooves 76 on its cylindrical surface. While other arrangements are possible, it has been found that optimum air bearing characteristics are obtained by arranging the V-notched grooves to the following specifications. On a scanning drum of approximately 3 inches diameter, in the preferred embodiment 3.17 inches diameter, 144 grooves are arranged uniformly around the periphery at a helical entry angle of 20° from a parallel to the drum axis. The faces of the V-notch grooves are perpendicular to one another and are respectively disposed substantially radial to the axis of the drum and chordal to the circumference of the drum. Specifically, the chordal face 76*a*, shown in FIG. 9, has a width of 0.03 inch and is angularly disposed from a radial line intersecting the midpoint of its width by an angle $\theta$ of 88°. The long trailing, substantially chordal face apparently provides a more uniform air bearing layer having a lower profile than other configurations thereby allowing the tape wrap to be transported uniformly close to the scanning drum without contact. The uniform air bearing layer prevents signal intensity distortion, caused by a fluctuating flying height of transported tape.

As illustrated in FIG. 8, the scanning drum 60 is readily removable for inspection or replacement. The heads are electrically connected to the rotating drive shaft 68 by concentrically arranged leaf spring contact 18 on the drum and shaft. Referring to the sectional view of FIG. 6 the head signals are transferred to or from the rotating drive shaft 68 to the stationary drum 62 by a conventional rotational transformer 80 fixed in part to the shaft and in part to the stationary drum.

The drive shaft is carried within the stationary drum by a pair of bearings 82 and 84 above and below the rotational transformer 80. The bearings 82 and 84, and the drive shaft 68 with connected drive motor 58 are spring loaded in the stationary drum by a compression spring 86 seated in a retaining sleeve 88. To control the rotation of the motor and to provide a timing signal of the head movement, a masking plate 90 having a plurality of concentric apertures, exemplar 92, is attached to the drive shaft and disposed between selectively arranged light emitting diodes 94 and photocells 96, as exemplified in FIG. 6. The servo and sync circuits utilizing signals generated by these components, particularly for video broadcasting, are described in greater detail in the previously referenced application entitled, Video Tape Recorder Method and Apparatus.

Figure 5:
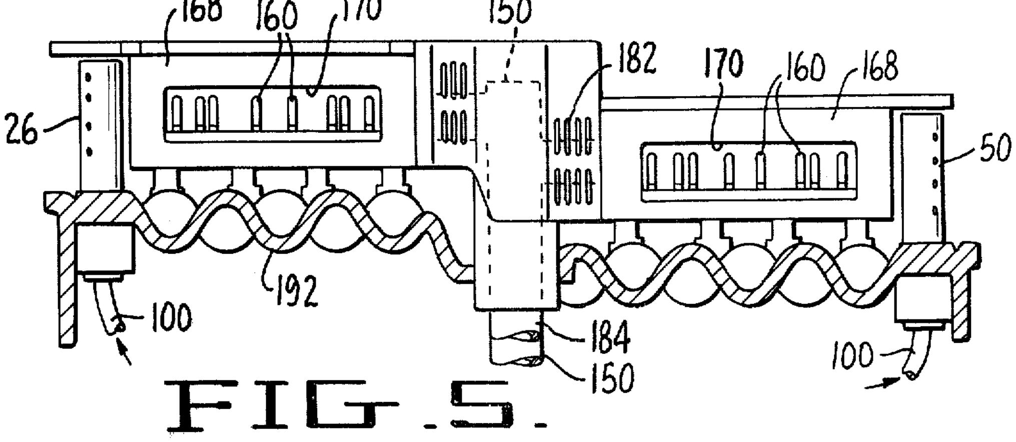
FIG. 5 is a sectional view of the vacuum columns taken on the lines 5—5 in FIG. 3.
Figure 12:
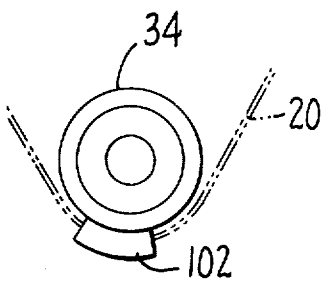
FIG. 12 is a plan view of the air bearing capstan of FIG. 11.
Figure 11:
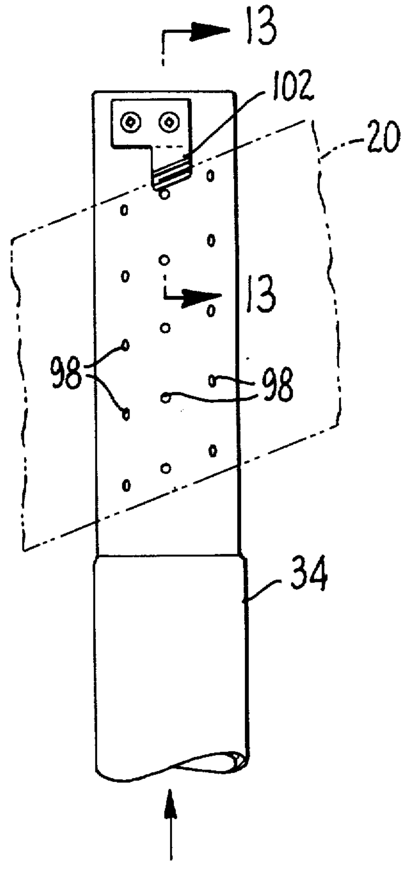
FIG. 11 is an enlarged elevational view of an air bearing capstan taken on the lines 11—11 in FIG. 3.
Figure 13:
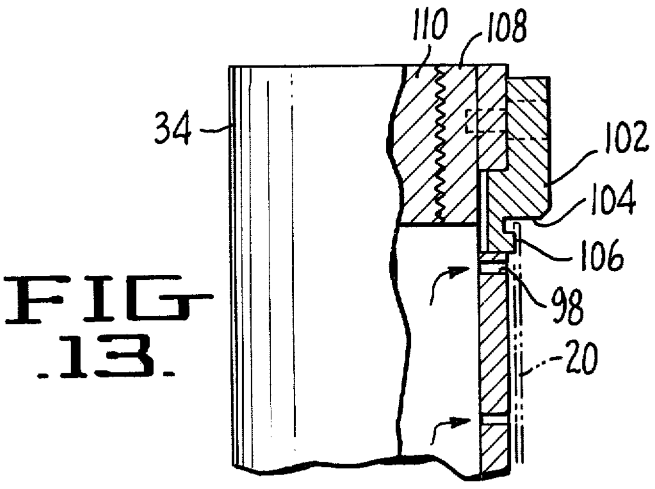
FIG. 13 is an enlarged fragmentary view of the air bearing capstan taken partially in section on the lines 13—13 in FIG. 11.

Returning again to a consideration of FIGS. 3 and 5, the two guide posts 34 and 38 which guide the tape in its helical wrap around the scanner are mounted on the base casting 56 of the scanner assembly 36 and comprise a peripheral component thereof. The construction of the guide posts is shown in FIG. 11, 12 and 13 and typifies the operation of not only both slanted guide posts 34 and 38 on the scanner assembly, but also the two vertical guide posts 26 and 50. Construction differences, of course are accorded to the particular vertical or slanted positioning of the posts.

Referring to FIG. 11, 12 and 13 guide post 34 has a portion of its peripheral surface uniformly perforated with small holes 98. As schematically noted an air flow is forced into the guide post, which is tubular, and bleeds out the holes creating an air cushion, on which the tape 20 is supported. The air flow is supplied by flexible tubes 100, shown in FIG. 4, which connect each of the four guide posts to an air supply. An edge guide 102 is mounted on each of the posts to guide the tape. Lip 104 restrains vertical movement of the tape, and face 106 provides a reference displacement of the tape from the surface of the post.

In this manner the tape is wrapped around the guide post 34 as shown in FIG. 12, and is supported on an air cushion such that the tape does not contact the surface of the post. The end of the tubular post has a cap 108 and plug 110 which can be removed to test or regulate the air pressure in the tube.

Referring again to FIGS. 3 and 4, the location of the drive capstan 46 is illustrated. The drive capstan both provides a guide for transport of the tape from the scanner assembly 36 to the vacuum column 48 and provides a control for the longitudinal movement of the tape. The drive capstan 46 and idler roller 30 both contact the otherwise "floating" tape and dampen any tape flutter for accurate recording at the scanner assembly located between these two components. The drive capstan as shown in FIG. 4, is coupled to a low inertia variable speed, variable direction drive motor 110 which normally draws the magnetic tape across the scanner during recording, but performs shuttling, servo controlled, and high speed transport of the tape during regular operation.

Figure 10:
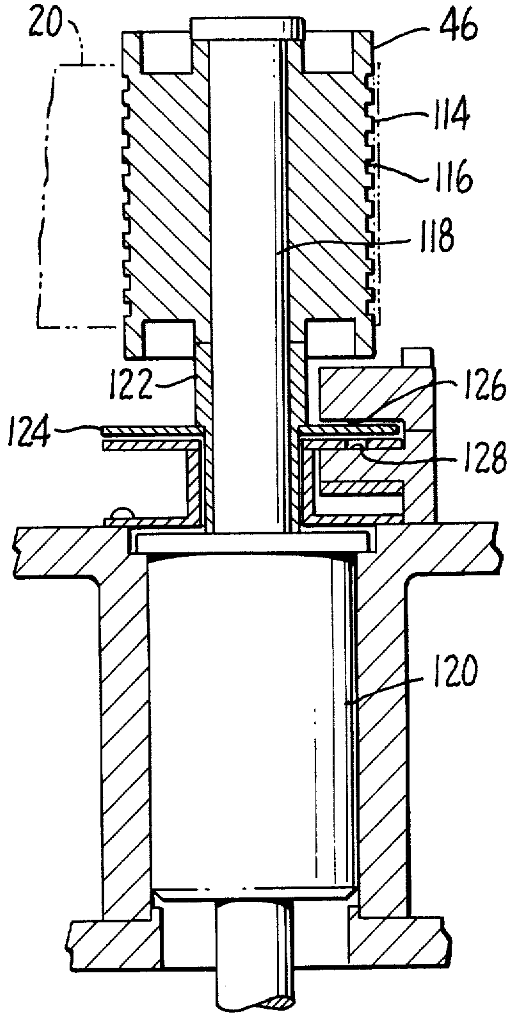
FIG. 10 is an enlarged sectional view of the drive capstan taken on the lines 10—10 in FIG. 3.

The drive capstan is shown in greater detail in FIG. 10 wherein the drive capstan 46 is shown with a tape drive cylinder 114 having a plurality of circumferential channels 116. The channels permit the tape to contact the surface of the cylinder 114 without forming an air bearing which would lift the tape off the surface and prevent the capstan from transporting the tape without slippage. The channels bleed the air trapped under the tape and allow a high-friction contact between the tape and the cylinder 114 of the capstan. The material forming the capstan cylinder may comprise any high friction material that can be accurately formed such as a hard, non-skidding rubber. Since longitudinal transport of the tape is coordinated with the rotation of the scanning heads, it is essential that the drive capstan be able to generate accurate adjustments and slip-free transport of the tape.

The cylinder 114 is attached to a drive shaft 118 connected to a bearing pack 120. Affixed to the drive shaft 118 on a sleeve 122 is a timing disk 124 having a plurality of apertures in an opaque masking surface of the disk which provides a timing pattern for a light emitting diode 126 and photocell 128 arranged on opposite sides of the disk. Signals from the diode and photocell arrangement are employed in the servo control of the capstan motor as detailed in the referenced application entitled Video Tape Recorder Method and Apparatus.

In addition to the components which directly guide the transport of the magnetic tape through the path initially outlined with reference to FIG. 2, several pneumatic controls act on the tape and make the transport system fully operational. Principal of the pneumatic control components are the pair of vacuum columns 28 and 48, the operation of which is schematically shown in FIG. 3.

Referring to FIG. 3 the oppositely mounted rectangular vacuum columns 28 and 48 are shown interconnected by a communicating air duct 150. The air duct 150, which is also shown in FIG. 5, is connected to a vacuum pump 152 and servo controlled flow valve 154, schematically shown in the sectional view of FIG. 14, which exhaust and adjustably regulate the evacuated air flow from the vacuum columns. The magnetic tape 20 is drawn into the vacuum columns in a loop 20*a*, as exemplified in the second vacuum column 48 shown in section, and is retained therein by a pressure differential created on each side of the tape. The servo controlled flow valve 154 comprises a conventional air flow valve which is variably controlled by a DC voltage signal. To permit air passage around the bottom edge of the tape loop 20a, a series of longitudinal channels 156 are provided in the base plates 158 of the vacuum columns. These channels 156, which are more clearly visible in the sectional view of FIG. 15, permit a controlled leakage of air under the tape thereby allowing sufficient air flow to minimize tension changes with displacements of the tape loops in the columns.

During recording sequences the tape tension is maintained at a constant level by control of the servo controlled flow valve 154. Various other levels of tape tension may be provided for other operational modes such as threading, shuttling or stopping modes. Of primary importance, howevere, is the ability to vary the tape tension during playback in order to adjust to physical changes in the tape during the period between record and playback. The flow valve 154 is servo controlled by a voltage signal generated from the off-tape horizontal sync signals as disclosed in the referenced application entitled, Video Tape Recorder Method and Apparatus.

The concept of controlling tape tension by varying the vacuum pressure in the vacuum columns may be accomplished by other means such as utilizing recorded timing signals on a longitudinal control track on transported tape that is keyed to a pressure monitor in the columns such that pressure in the columns is monitored by an error signal generated on comparison of a recorded timing signal to a reference clock. Other methods and control circuits will be apparent to one skilled in the art.

Under both servo and constant level control, both vacuum columns are operated under the same conditions since air duct 150 is connected to both columns jointly. In this manner total control of the tape transport is performed by the drive capstan 46. While such tandem operation is not necessary for an operable system, it is perhaps the simplest. Alternate systems may utilize differing pressures in the two columns and thus assist or retard tape transport by the drive capstan.

To control the tension of the tape, the vacuum system of the vacuum columns acts in combination with a tape loop monitoring system. The monitoring system in effect maintains the tape at any optimum position within the vacuum columns, adjusting for any acceleration in the tape transport or changes in tape tension which displace the tape loop 26 in the columns. These displacements continually and properly occur since the principal function of the vacuum columns is to provide a buffer for instantaneous changes in tape transport occurring at the low inertial drive capstan 46 which are subsequently transmitted to the high inertial mechanical drives of the supply and take-up hubs for the tape reels.

Figures 15, 16:
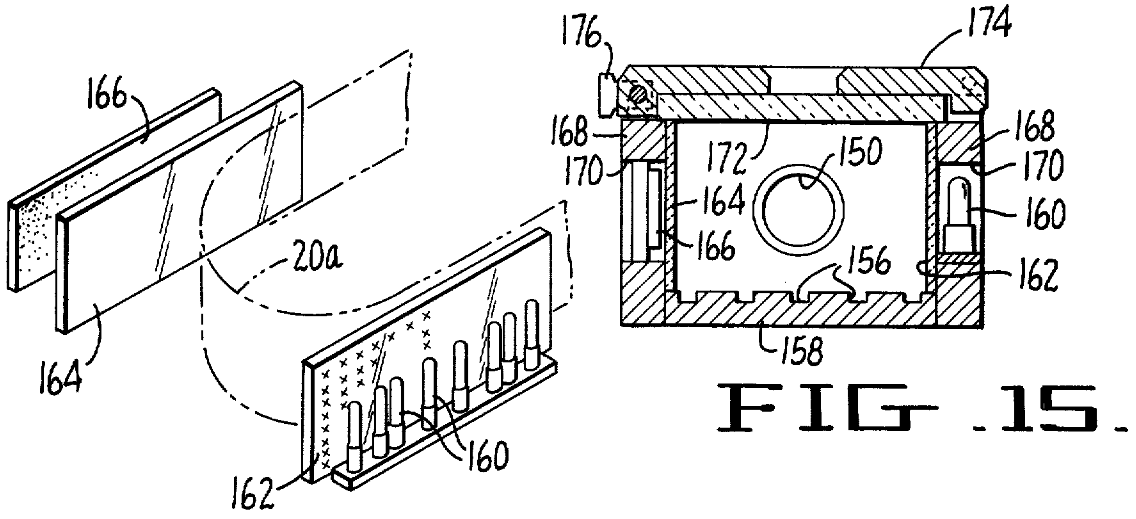
FIG. 15 is an enlarged sectional view of the vacuum column taken on the lines 15—15 in FIG. 3.
FIG. 16 is a schematic perspective view of the tape length monitor shown in FIG. 15.

The monitoring system comprises a bank of light emitting diodes 60 or incandescent lamps arranged on one side of a translucent plate 162 in the manner shown in FIGS. 3, 5 and 16. The light arrangement uniformly distributes the light at the inner or tape side of the translucent plate. On the opposite side of the vacuum column is arranged a transparent plate 164 which protects a strip 166 of uniformly light sensitive photoconductive material. The resistance change in the photoconductive strip 166 causes an electrical signal to be produced proportional to the area of the strip exposed to the light at the transparent plate 164. When the tape loop 20a is in the vacuum columns 28 and 48, a proportion of the photoconductive strip is masked by the tape loop and a signal corresponding to the proportion of the strip exposed is generated across the strip. By proper calibration and appropriate conventional circuitry the signal can be amplified and used to drive servo controlled motors (not shown) at each of the tape reel hubs 24 and 54. The position of the tape loop in the vacuum columns can thus be continually monitored and controlled to an optimum position and vibration producing stop start conditions caused by incremental monitoring in conventional systems can be avoided.

As shown in FIGS. 3, 5 and 15, the vacuum columns are provided with outer enclosure plates 168 adjacent the translucent and transparent plates having an aperture 170 to permit visual inspection of the lamps and access to the photoconductive strip. As shown in FIG. 15 the top of the vacuum columns are sealed by a ground glass plate 172 which is mounted to a hinged cover 174 having an aperture 176 to permit inspection of the tape loop. The glass plate 172 is tinted to prevent exterior light from affecting the photoconductive strip in the tape monitoring system. The hinged cover 174 has a bolt latch 177 which locks the cover on the side plate 168 and completes the enclosure of the vacuum columns.

Figure 14:
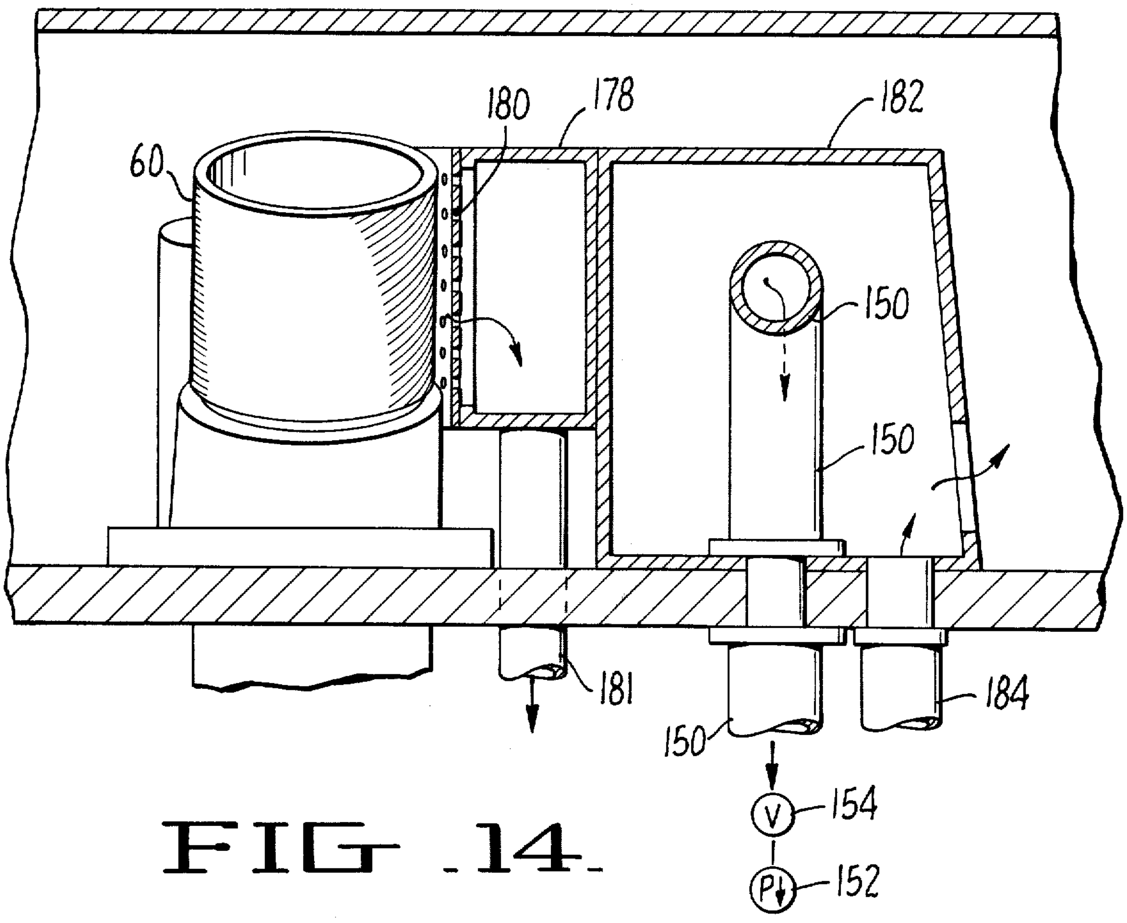
FIG. 14 is an enlarged sectional view of the scanner assembly and vacuum columns taken on the lines 14—14 in FIG. 3.

A second pneumatic control component shown in FIG. 3 comprises a vacuum collar 178 around the portion of the scanner assembly 36. The vacuum collar 178 is arranged with a porous curved section 180 adjacent the scanner assembly as shown in FIG. 14. The vacuum collar 178 there depicted is connected to a vacuum duct 181 in which is automatically created a vacuum suction by a pump or shunt, not shown, when the tape 20 is stopped thereby protecting the tape from incurring localized wear caused by the repetitious travel of the heads in the scanning drum across an isolated portion of the tape.

A third pneumatic control component shown in FIG. 3 and 5 comprises an air pressure vent 182 which, as shown on the deck schematic in FIG. 14, is connected to an air duct 184 arranged adjacent the air duct 150 for the vacuum columns. The air pressure vent simply provides a moderate, controlled pressure over the tape deck of the recorder transport assembly to prevent dust and other contaminants from entering. Further, when outer cover 185 on the control console 12, shown in FIG. 1, is opened, air will be vented outwardly, thereby again preventing contaminants from entering the control console.

In addition to the mechanical and pneumatic components which contribute to the highly efficient and precise transport system disclosed above, a structural component should also be considered for its contributing effect. The structural component comprises the overall construction of the tape deck which is specifically designed to inhibit acoustical and vibrational transmissions from one component to another. While the basic concepts involved in the tape deck design are disclosed in greater detail and claimed in the referenced application entitled Vibrational and Acoustical Damped Casting, the element is nevertheless a contributing element in the combination tape transport system herein disclosed.

Figure 17:
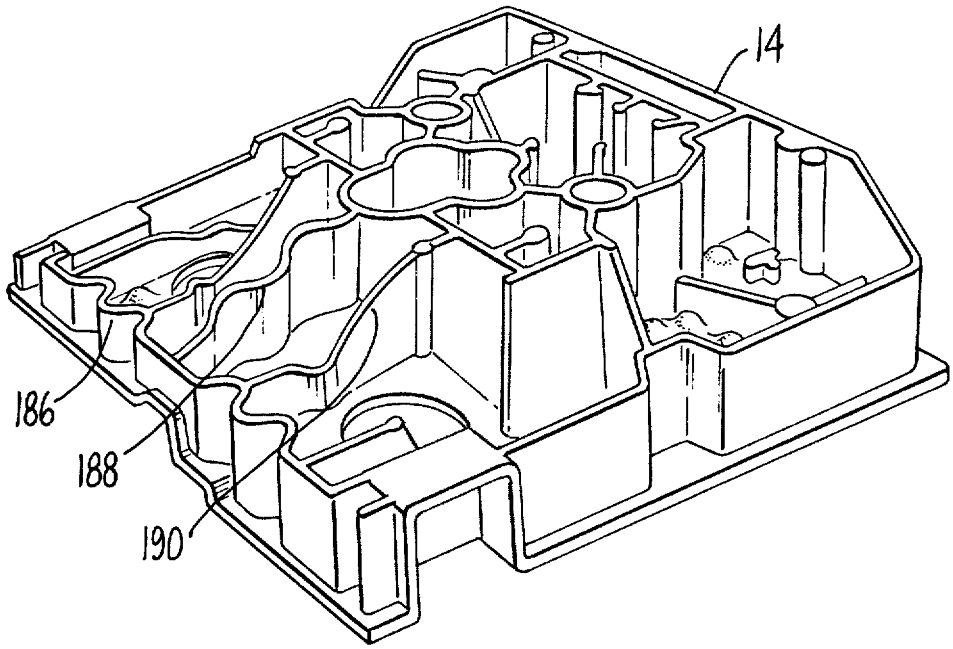
FIG. 17 is a perspective view of the underside of the tape deck.

With reference to FIG. 17 the tape deck 14 is shown comprising a casting having on the underside of the deck plurality of substantially nonlinear ribs which are interconnected to provide a structurally rigid deck for supporting the components of the transport system.

Where possible the ribs are nonlinear to inhibit the straight line transmission of structural vibrations, eliminate resonant surfaces, and increase the reflective surfaces for dampening of acoustical wave patterns carried in the casting. For example, circumferential edge rib 186 is serpentine and of varying height, as are exemplar internal ribs 188 and 190.

Interconnecting the ribs, the tape deck is comprised of bi-directionally corrugated surface 192 as shown in the sectional view of FIG. 5. These nonplanar webs between the ribs eliminate the resonant plates which otherwise not only transmit vibrations but also receive acoustical energy from the exterior environment and generate sympathetic vibrations in the deck. In addition to the nonlinear ribs and nonplanar web, added dampening of acoustical and structural vibrations can be accomplished by coating the surface of the casting with a dampening coating material such as buna-N.

In this manner maximum protection of sensitive components can be obtained, where for example high inertia drive motors and pneumatic lines generate vibrations which are transmitted to the sensitive components.

For example, the scanner assembly of this transport system is extremely sensitive and must, of operational necessity, be vibrationally isolated from the motors driving the tape reel hubs and the air ducts connecting the vacuum columns.

It is therefore apparent that beginning with the scanner assembly a plurality of components and subcombinations cooperate and contribute to create the advanced transport system of this invention.

The concept of variably and instantaneously controlling tape tension by continuous monitoring of the vacuum pressure in the vacuum columns is a key concept which enables the advantageous use of vacuum columns in a helical type recording system. In this manner, longitudinal shrinkage or stretch of the tape after initial recording can be physically corrected. While a variety of devices of conventional operation can be devised to monitor the air flow from a vacuum pressure in the vacuum columns in response to an electrical signal, the preferred embodiment disclosed in detail herein provides one example of the type of means intended. To employ this selected means to its greatest advantage, certain modifications to the vacuum columns and deck arrangement are disclosed as an alternate and preferred embodiment to the embodiments previously described. However, it is not intended that the means described herein comprise the only means of practicing the basic concept of modulating tape tension with vacuum columns.

Figure 18:
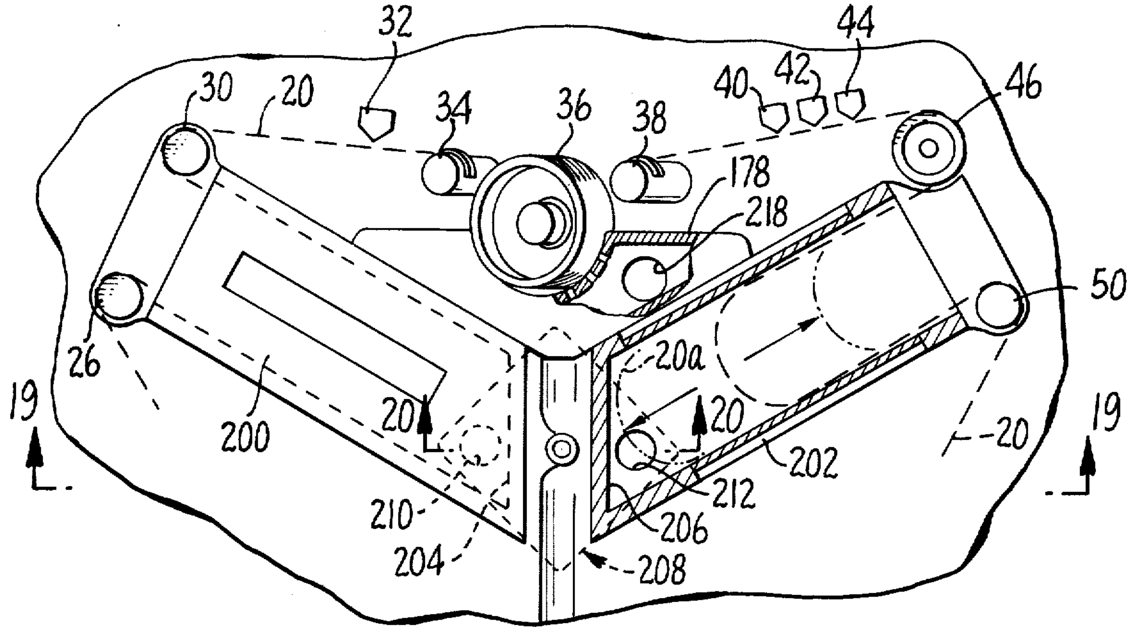
FIG. 18 is a fragmentary plan view partially in section of the tape transport system and modified deck.
Figure 19:
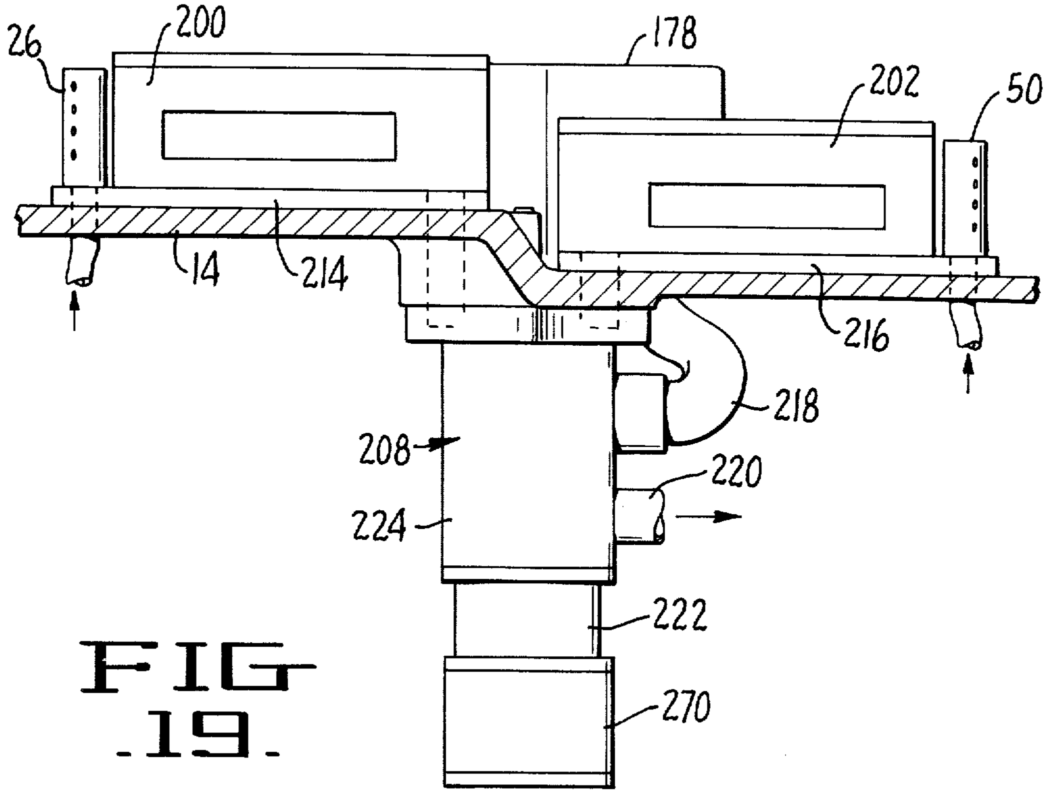
FIG. 19 is a sectional view taken on the lines 19—19 in FIG. 18 showing the vacuum pressure monitor apparatus.
Figures 26, 27, 28:
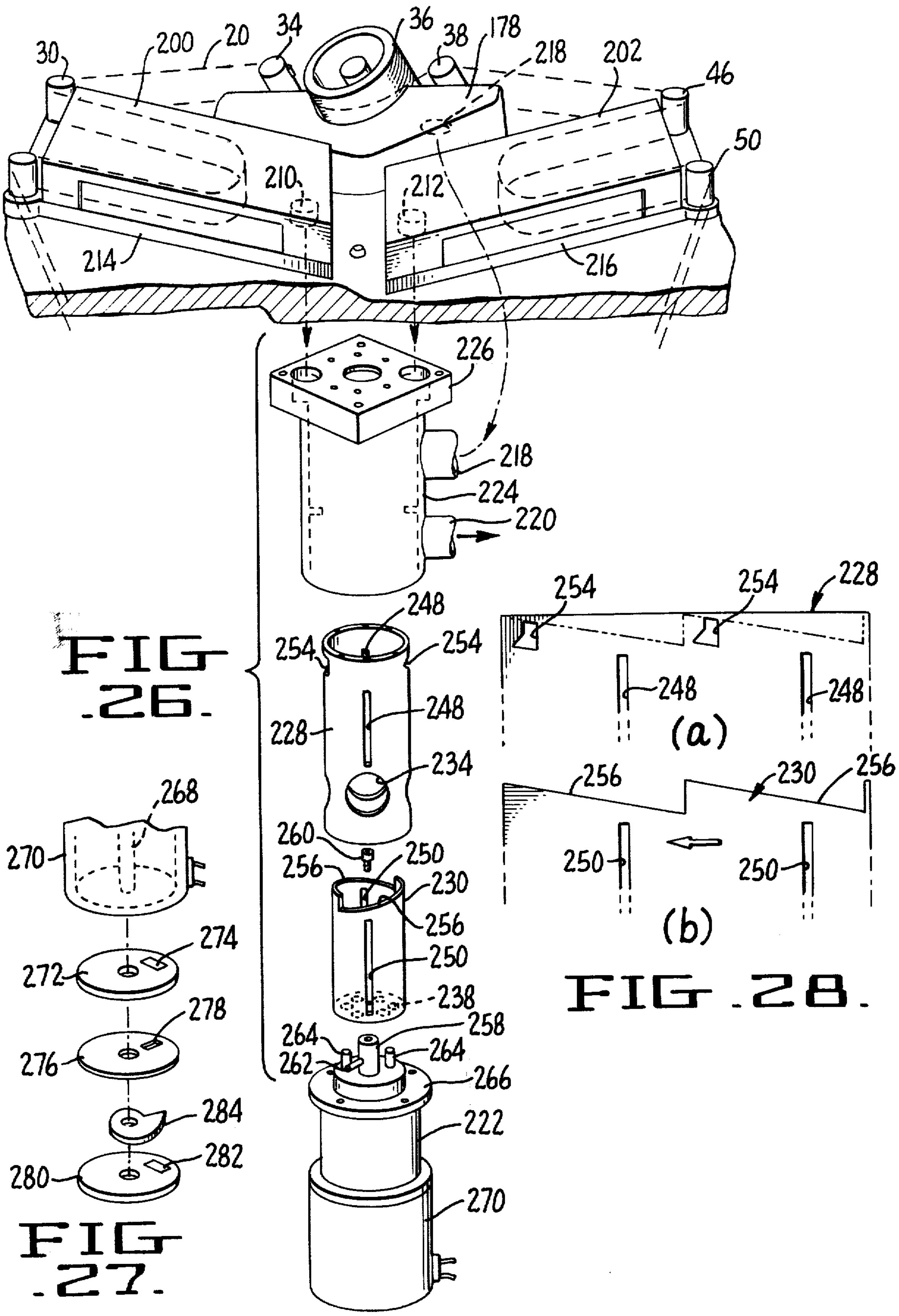
FIG. 26 is an explosed view of the vacuum pressure monitor apparatus.
FIG. 27 is an exploded view of the lower portion of the monitor apparatus in FIG. 26.
FIG. 28 is a view of a template schematic of the air flow control components in the monitor apparatus of FIG. 26.

Referring to the drawings and to FIGS. 18, 19 and 26 in particular, the tape deck 14 is shown with a first air bearing guide post 26, an idler roller 30, an erase head 32, a first slanted air bearing guide post 34, a scanner assembly 36, a second slanted air bearing guide post 38, head stacks 40, 42 and 44, a drive capstan 46, and a second air bearing guide post 50 as in the embodiment previously described. However, the embodiment presently described includes modified vacuum columns 200 and 202. The modified vacuum columns are constructed with an angled end face 204 and 206, respectively, to optimize their arrangement with a vacuum monitor apparatus 208 attached to the underside of the deck 14.

Vacuum ducts 210 and 212, each formed by a hole through the deck 14 and complementary base plates 214 and 216 of the vacuum column, operationally connect the vacuum monitor apparatus to the vacuum columns. In the present embodiment, the base plates are flat and the longitudinal channels 156 of the previously described base plates 158 are omitted.

In addition to eliminating the need of special ducts, this arrangement of the vacuum ducts 210 and 212 has an operational advantage. When a tape loop 20*a* is drawn into a vacuum column, as successively illustrated in phantom in FIG. 18, such that the edge of the tape loop overshoots its normal operating range and advances over the opening of the duct as shown, the pressure differential on each side of the tape loop is suddenly equalized. When so equalized, the tape loop cannot be further drawn into the column by the vacuum suction from the vacuum monitor apparatus. The tape loop overshoot can then be mechanically corrected by the tape loop monitoring system in the normal manner previously described. The location of the openings of the vacuum ducts in the base of the vacuum column thus provides a safety check preventing the tape 20 from being drawn against the end face of the vacuum columns, as may be otherwise occasioned by a vacuum duct connected to the end face. During normal operation, however, it is expected that the response of the tape loop monitoring system will be adequately responsive to tape loop location to prevent the tape from being drawn to a position in which this check is necessary The vacuum monitor apparatus 208, in addition to continuously monitoring the tension of the recording tape, also controls the pressure to the vacuum collar 178 that partially encompasses the scanner assembly 36, as shown in FIG. 18 and described previously. The vacuum collar 178 operates on an on-off basis, vacuum being supplied when transport of the tape is halted to draw the tape away from the scanner. This operation can additionally be performed by the vacuum monitor apparatus avoiding a duplication of components. The vacuum collar 178 is connected via a vacuum duct 218 to the side of the monitor apparatus 108 as shown in FIG. 19. In this manner, the vacuum collar utilizes a common vacuum supply 220 and electric motor 222 on the monitor apparatus for its controlled operation.

The components of the vacuum monitor apparatus are shown in greater detail in FIGS. 20 through 29. Referring to the exploded view of FIG. 26, the vacuum monitor apparatus includes an outer casing 224 coupled to a mounting block 226 which is attached to the underside of the deck 14. Fixed within the outer casing is an inner casing 228. Snugly inserted within the inner casing 228 is a cylindrical inner sleeve 230. This inner sleeve 230 is attached to the electric motor 222 and is arranged to rotate concentrically within the inner casing 228. Rotation selectively controls the pressure in the vacuum columns 200 and 202 and the vacuum collar 178 by monitoring their connection with the vacuum supply 220.

The electric motor 222 comprises a low inertia variable speed, variable direction drive motor similar to the drive motor 58 for scanner assembly 36. The motor 222 rotates the inner sleeve 230 in response to a servo signal obtained from a horizontal sync signal as described previously. Since the horizontal sync signal is carried in the diagonal video tracks, change in the length of the tracks from stretch or shrinkage will be reflected in the horizontal sync signal. This signal can provide the indicia means for generating a servo drive signal for the motor. As noted, alternate signals can be used in generating a servo drive signal such as a clocking signal recorded in a longitudinal track on the tape. However, since it is ultimately the horizontal sync signal that is adversely affected by tape stretch or shrinkage, it is preferred that this signal be employed in the generation of the servo signal.

Figures 20, 21, 22, 23, 24, 25:
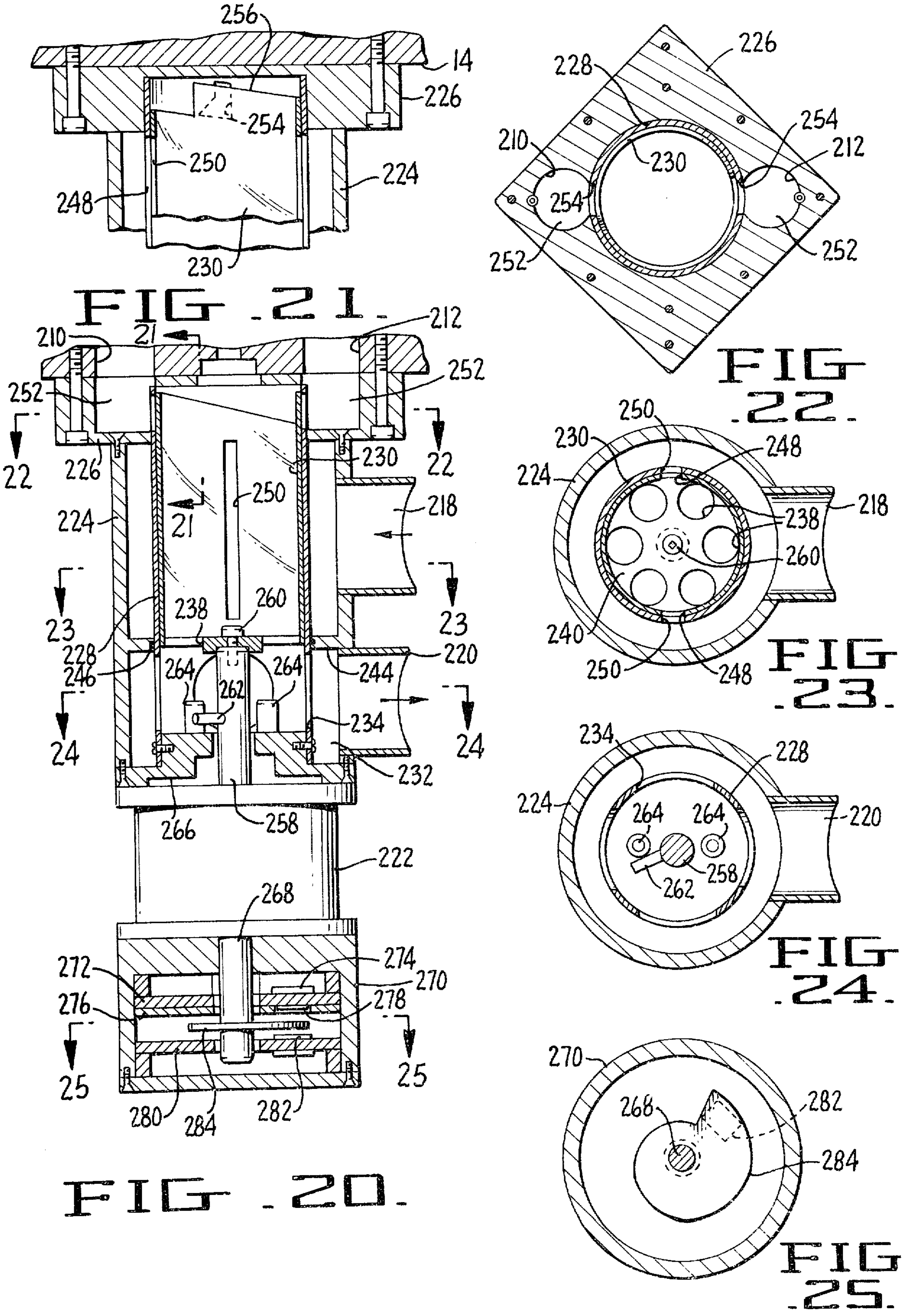
FIG. 20 is a sectional view of the vacuum pressure monitor apparatus taken on the lines 20—20 in FIG. 18.
FIG. 21 is a sectional view of the monitor apparatus taken on the lines 21—21 in FIG. 20.
FIG. 22 is a cross sectional view of the monitor apparatus taken on the lines 22—22 in FIG. 20.
FIG. 23 is a cross sectional view of the monitor apparatus taken on the lines 23—23 in FIG. 20.
FIG. 24 is a cross sectional view of the monitor apparatus taken on the lines 24—24 in FIG. 20.
FIG. 25 is a cross sectional view of the monitor apparatus taken on the lines 25—25 in FIG. 20.

The interrelationship of the above described components of the vacuum monitor apparatus is shown most clearly in the sectional view of FIG. 20, and the complementary cross sectional views in FIGS. 22 through 25. Referring to FIG. 20, the outer casing 224 and coupled mounting block 226 are constructed and arranged with respect to the inner casing 228 such that three distinct chambers are formed therebetween.

The first chamber 232 communicates directly with the vacuum supply 220, and, by a series of openings 234 in the lower portion 236 of the inner casing 228 shown in FIGS. 24 and 26, a series of openings 238 in the base 240 of the inner sleeve 230 shown in FIGS. 23 and 26, communicates with the volume within the inner sleeve. The openings in the inner casing and the openings in the inner sleeve are of sufficient size that there is substantially no impedance from the vacuum supply to the volume within the inner sleeve. In this manner, the volume within the inner sleeve comprises merely a continuation of the vacuum supply.

The second chamber 242 which is separated from the first chamber 232 by an annular divider 244 in the outer casing with O-ring seal 246, communicates with the vacuum duct 218 connected to the vacuum collar 178 referred to previously. As shown most clearly in FIG. 26, the inner casing 228 and inner sleeve 230 each have two elongated slots 248 and 250, respectively, which are oppositely located in their cylindrical walls. When superimposed, as shown in FIGS. 20 and 23, the slots provide a direct communication between the vacuum supply volume within the inner sleeve 230 and the second chamber 242 and vacuum duct 218 to vacuum collar 178. In this relative position, the vaccum pressure supplied to the vacuum collar draws the tape away from the scanner assembly as previously described.

Rotation of the inner sleeve will mask the slot 248 in the inner casing and block the vacuum supply from the vacuum collar 178. Therefore, unless the two slots are aligned such that they are superimposed, a vacuum pressure will be blocked from the vacuum collar 178.

The third chamber 252 is divided into two parts located in the mounting block 226 on opposite sides of the inner casing 228. In this respect, each part of the divided chamber 252 is coincident with the two vacuum ducts 210 and 212 which communicate with the vacuum columns 200 and 202, respectively.

Each part of the divided chamber 252 communicates with the vacuum supply volume within the inner sleeve 230 through an identical aperture 254 on opposite sides of the inner casing 228 as shown in FIG. 26. The configuration of the apertures 254 is illustrated in the template schematic (a) of FIG. 28 and in FIG. 21. The effective size of the apertures 254 is controlled by the upper lip 256 of the inner sleeve which is helically contoured in the manner illustrated in the template schematic (b) of FIG. 28. The double helical cut of the upper lip 256 of the inner sleeve, shown perspectively in FIG. 26, allows the inner sleeve 230 to partially and identically mask each aperture such that the effective size of each of the two oppositely positioned apertures 254 is the same. In this manner the flow of air through both partially masked apertures, the vacuum pressure in each of the two vacuum columns, and hence the resultant tension applied to the tape on each side of the scanner assembly is the same.

It may be desirable to imbalance the tension in the tape by applying a different vacuum pressure in each of the columns, for example, to provide a forward bias to the tape to assist the drive capstan in tape transport. This can be accomplished by a simple redesign of either the aperture or upper lip of the inner sleeve or both. However, in the embodiment described herein, it is preferred that the vacuum pressure in each column be balanced for simplicity in the operation and fabrication of components.

To control the inner sleeve 230, the sleeve is attached to a drive shaft 258 of the electric motor 222 by a bolt 260 through the sleeve base 240. The drive shaft 258 includes a pin 262 which contacts either of two stops 264, shown in FIGS. 20 and 24, to prevent overshoot of the rotating sleeve. The stops are mounted on a base cover 266 to which the inner casing is also mounted. The electric motor 222 is mounted to the base cover 226 and includes an oppositely directed shaft 268 which projects into a photoelectric sensor housing 270. The housing 270 as shown in the sectional view in FIG. 20 and in the exploded view in FIG. 27 encloses and supports a first disk 272 for supporting a light source 274 coupled to a second disk 276 supporting a light diffuser 278 and spaced from a third disk 280 supporting a photosensitive material 282 that generates an electrical signal substantially proportional to the illumination of its surface. Positioned between the coupled first and second disks and the third disk is a spiral mask 284 which is mounted to the shaft 268. As the shaft rotates, the spiral mask 284 is similarly rotated exposing a greater or lesser surface area of the photosensitive material. In this manner, the output signal of the photosensitive material can be keyed to the position of the inner sleeve 230 and hence the vacuum pressure of the columns. This position signal can be compared with a d.c. error signal generated from the horizontal sync signal to produce a servo drive signal for the motor during tension modulation of the tape. In other modes of operation, the position signal is compared with other fixed state signals to produce a servo drive signal to maintain a predetermined pressure in the vacuum columns and/or apply a vacuum pressure to the vacuum collar. A preferred circuit control for the various operations of the disclosed transport system is described in the referenced application entitled "Video Tape Recorder Method and Apparatus."

The transport system is operated in four primary modes, each having a different optimum operating tension for the tape. The positioning of the inner sleeve is calibrated to the resultant tensions desired for each operating mode. The following tension ranges described have been found to permit a desired operation in each of the four modes for the transport system described. However, since optimizing the tensions can only be accomplished by experimentation for the particular machine constructed, these tensions are provided only for the purpose of example.

In the stop mode, the tension is relaxed to a fixed low tension in the approximate range of 3–5 ounces. In this mode, the vacuum collar is "on," i.e., vacuum pressure is supplied to the collar to draw the tape away from the scanner to avoid unnecessary wear from the repeated tracking of the heads over a single portion of the tape.

In the play record mode, a predetermined tension is set, for example, 15 ounces, such that the initial recording is uniform for all machines thereby providing a standard for compatibility between all machines at an optimum tension.

In the play reproduce mode, the tension is modulated, for example, between 10–30 ounces. In this manner, stretch or shrinkage can be temporarily corrected to physically return the tape read at the scanner to the conditions of the record mode. While the tape will generally be maintained around the 15 ounce mark, the tape condition is continuously monitored by the detecting means described and tension continually modulated in response by the varying pressure in the vacuum columns, such that the conditions during recording of the tape are duplicated during reading of the tape.

In the shuttle modes, for which there may be a plurality of shuttle speeds, the tape tension is maintained at fixed tension in the range of 16–18 ounces. Since the tension in the shuttle modes is not as critical as in the two play modes, the tension might conveniently be the same as the play record mode.

Since the tape tensions in the two play modes and in the shuttle modes are substantially higher than in the stop mode, there is no possibility that the vacuum collar will be inadvertently pressure activated.

Since tape tension is controlled and modulated pneumatically by variance of the vacuum pressures in the vacuum columns, the use of high inertia mechanical components which mechanically act on the tape can be avoided. In this manner, the high response of the drive capstan achievable by the use of vacuum columns for the supply of low inertial tape, can be maintained.

We claim:

1. A tape transport system for transporting magnetic tape on a predetermined tape path comprising in combination:

- a supply means for continuously supplying magnetic tape at the beginning of the tape path;
- a take-up means for continuously storing magnetic tape at the end of the tape path;
- a plurality of air bearing guide means for low friction guiding of the tape on the tape path;
- a helical scanner assembly arranged on said tape path;
- a first vacuum column and a second vacuum column arranged on the tape path on either side of said helical scanner assembly between said supply means and said take-up means having air control means for variably controlling the tension of the tape across said helical scanner assembly, and having monitoring means for continuously monitoring the distance of the tape loop in said columns; and
- a drive capstan arranged on said tape path between said vacuum columns, said drive capstan having drive means for transporting tape on said path.

2. The combination of claim 1 wherein the elements of said combination are mounted on a tape deck comprising a casting having a bi-directionally corrugated surface for dampening of structural vibrations.

3. A tape transport system having a recording mode and a playback mode for transporting magnetic tape on a predetermined tape path comprising:

- supply means for continuously supplying magnetic tape at the beginning of the tape path;
- take-up means for continuously storing magnetic tape at the end of the tape path;
- a first vacuum column and a second vacuum column arranged on the tape path between said supply means and said take-up means;
- monitoring means, including variable air evacuation means responsive to a control signal for retaining a tape loop in said vacuum columns;
- a helical scanner assembly for recording information on the tape and reading recorded information from the tape;
- drive means for transporting tape across said scanner assembly, said scanner assembly and drive means arranged on said tape path between said vacuum columns; and
- circuit control means, operating in combination with said monitoring means applying a control signal to said variable air evacuation means for maintaining a predetermined constant vacuum pressure in said vacuum columns to provide a predetermined tension in the tape during the recording mode and for controllably varying the vacuum pressure in said vacuum columns to modulate the tension in the tape during the playback mode for duplicating recording conditions during the playback mode.

4. The tape transport system of claim 3 wherein recorded information on said tape includes a reference signal from which longitudinal stretch or shrinkage in the tape can be detected, and

- said circuit control means includes first means for generating a fixed state signal for maintaining a constant vacuum pressure in said vacuum columns during the record mode, and second means receiving said reference signal read from said tape during the playback mode and generating an error signal in response thereto for applying said error signal as said control signal to said variable air evacuation means to thereby vary the vacuum pressure in the vacuum columns in response to said reference signal during the playback mode.

5. The tape transport system of claim 4 wherein said monitoring means comprises further,

- means arranged with said first and second vacuum columns and operably connected to said supply and take-up means for detecting and monitoring the length of the tape loops in said vacuum columns.

* * * * *